Sept. 14, 1937.  T. MILLER  2,093,203
ENGRAVING AND RELATED MACHINE
Filed Oct. 6, 1932  4 Sheets-Sheet 1

Inventor
Theodore Miller
By Hubert E. Peck  Attorney

Sept. 14, 1937.   T. MILLER   2,093,203
ENGRAVING AND RELATED MACHINE
Filed Oct. 6, 1932   4 Sheets-Sheet 2

Inventor
Theodore Miller
By Hubert T. Peck   Attorney

Sept. 14, 1937.    T. MILLER    2,093,203
ENGRAVING AND RELATED MACHINE
Filed Oct. 6, 1932    4 Sheets-Sheet 3

Sept. 14, 1937.　　　　T. MILLER　　　　2,093,203
ENGRAVING AND RELATED MACHINE
Filed Oct. 6, 1932　　　4 Sheets-Sheet 4

Patented Sept. 14, 1937

2,093,203

UNITED STATES PATENT OFFICE 2,093,203

ENGRAVING AND RELATED MACHINE

Theodore Miller, Chicago, Ill., assignor to George Gorton Machine Company, Racine, Wis., a corporation of Wisconsin Application October 6, 1932, Serial No. 636,578

40 Claims. (Cl. 33—22)

This invention relates to engraving and related machines, and the objects and nature of the invention will be understood by those skilled in the art in light of the following explanations of the accompanying drawings that illustrate the preferred mechanical expression or embodiment of my invention from among other forms, arrangements and organizations within the spirit and scope thereof.

An object of the invention is to provide a comparatively inexpensive, simple and easily operated yet effective organization peculiarly adapted for engraving, marking, etching, or cutting a design or indicia on the surfaces of work of approximately cylindrical or round rod-like formation.

A further object of the invention is to provide an organization that includes a cutter subject to lineal or lateral movements in a plane at right angles to the longitudinal cutter axis, with mechanism for rotating cylindrical or approximately round work on its longitudinal axis with a peripheral speed equal to the lineal speed of the cutter regardless of the diameter of said work within the capacity of the organization, when said lineal movements of said cutter are in planes at right angles to the plane in which the longitudinal axis of said work is located.

A further object of the invention is to provide an organization that includes a cutter subject to universal lineal or lateral movements in a plane at right angles to the longitudinal cutter axis, with mechanism for rotating elongated cylindrical or approximately round work on its longitudinal axis a peripheral distance equal to the lineal distance of cutter movement transversely with respect to said work axis, when said lineal movements of the cutter are in planes at right angles to the plane in which said work axis is located, and to hold said work stationary when said lineal cutter movements are in a plane that includes said longitudinal axis of the work.

A further object of the invention is to provide an engraving or related machine embodying a cutter head carrying the rotary cutter spindle, having a universal lateral movement over the work while the axis of said spindle is held substantially perpendicular to the work or to the plane of said universal lateral movements, with a work holder cooperatively associated with said cutter head to hold the work to the holder and to automatically rotate the work on its longitudinal axis with respect to the cutter spindle by lateral movements of said head or spindle transversely with respect to the work, and to permit lateral movements of said head or spindle longitudinally of and relatively with respect to said work.

A further object of the invention is to provide an engraving, etching, cutting or marking organization capable of reproducing a design or indicia on the cylindrical and longitudinally tapered circumferential surfaces of elongated work by cuts of uniform depth, on a continuous operation, with such design or indicia extending both longitudinally and transversely of the cylindrical and longitudinally tapered portions.

A further object of the invention is to provide a floating cutter spindle having its longitudinal axis perpendicular to the longitudinal axis of the work and having its axial line intersecting said axial line of the work, in an organization for etching, cutting, engraving or marking indicia or designs in the circumferential surfaces of the cylindrical and longitudinally tapered portions of elongated work, with a floating cutter spindle depth stop presser foot embodying a foot having a bottom surface to slidably bear down on the work surface along the top longitudinal line thereof, with said foot relatively rockable on an axial line perpendicular to and intersected by the axial line of the cutter spindle and located in a plane at right angles to the plane of the longitudinal axis of the work.

With the foregoing, and other objects, in view, the invention consists in certain novel features in construction, and in combinations, organizations and/or arrangements as more fully described, specified and pointed out hereinafter.

Referring to the accompanying drawings forming part hereof.

Figure 1:
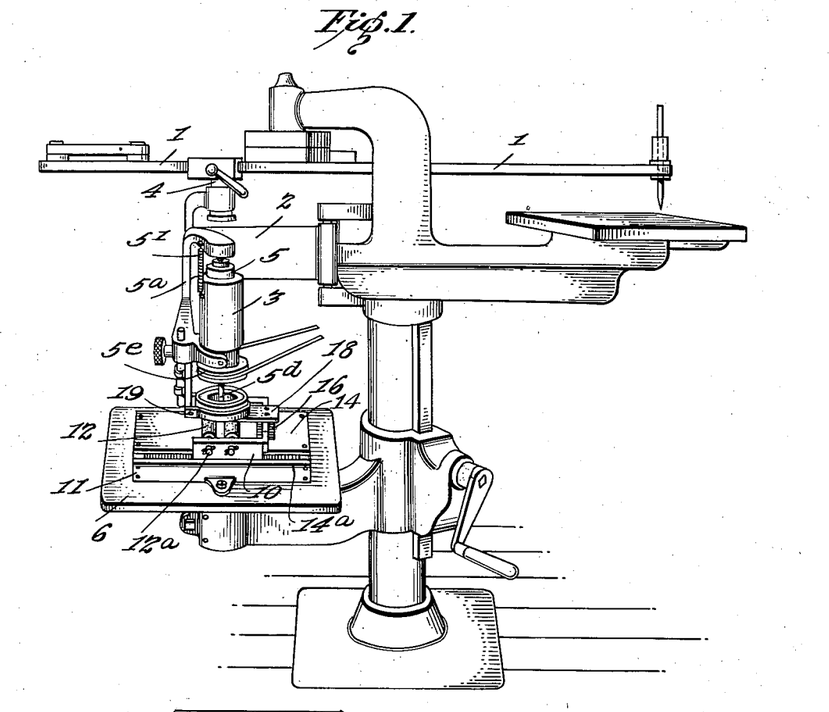
Fig. 1 diagrammatically illustrates in perspective a common type of engraving machine equipped with my invention.
Figure 2:
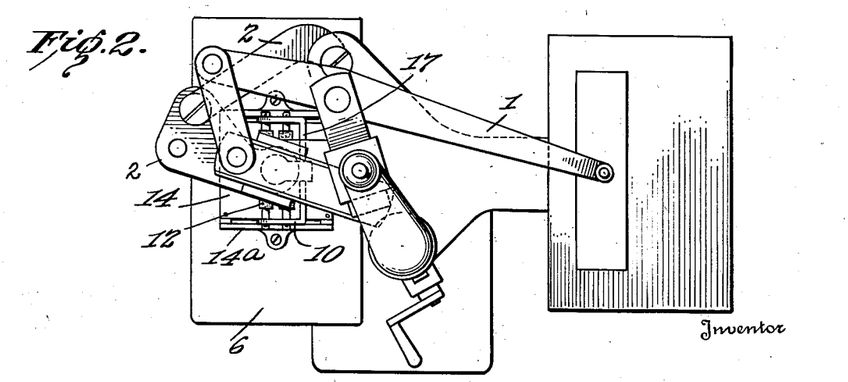
Fig. 2 shows in top plan the organization of Fig. 1.
Figure 3:
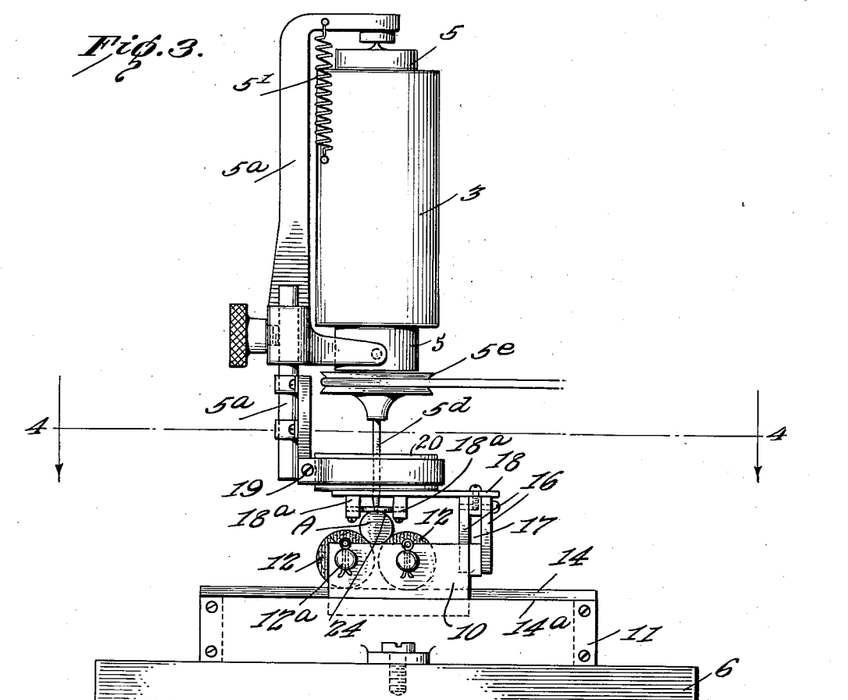
Fig. 3 is a detail side elevation of a laterally movable cutter head combined with a cutter spindle depth stop pressure foot and work holder of my invention.
Figure 4:
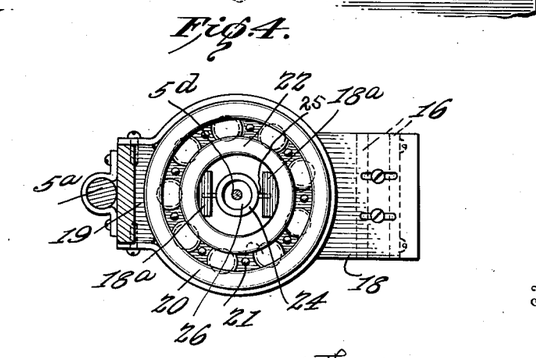
Fig. 4 is a detail section taken on the line 4—4, Fig. 3.
Figure 5:
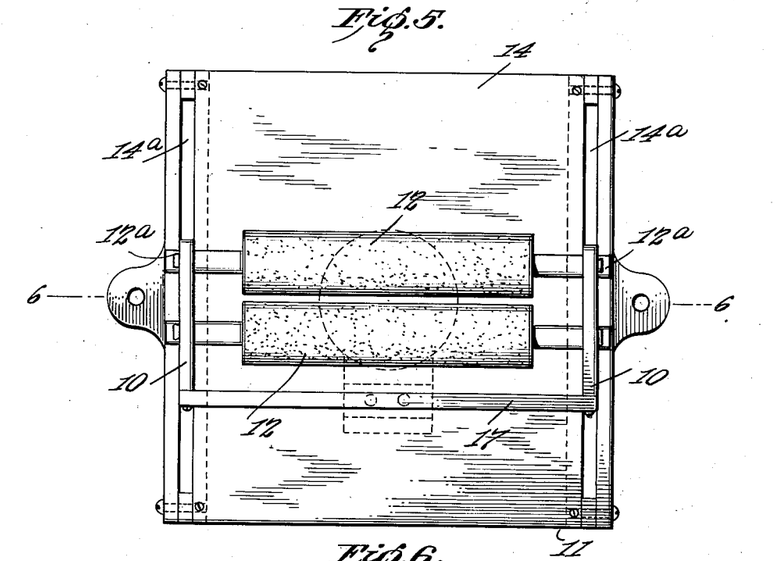
Fig. 5 is a detail enlarged top plan of the work holder example shown in previous views.
Figure 6:
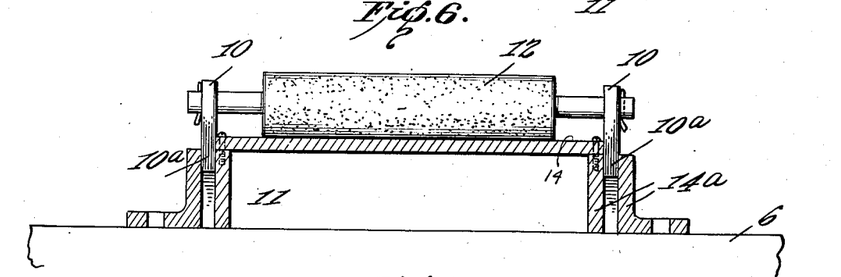
Fig. 6 is a detail vertical section in the plane of the line 6—6, Fig. 5.
Figure 7:
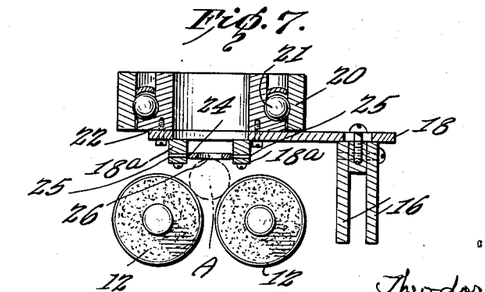
Fig. 7 is a detail fragmentary view showing in vertical section and in part, the operative connection from the cutter head to the work holder carriage, the work holder carriage except for the two rollers, the cutter spindle depth stop foot and its mounting being shown in vertical section.
Figure 8:
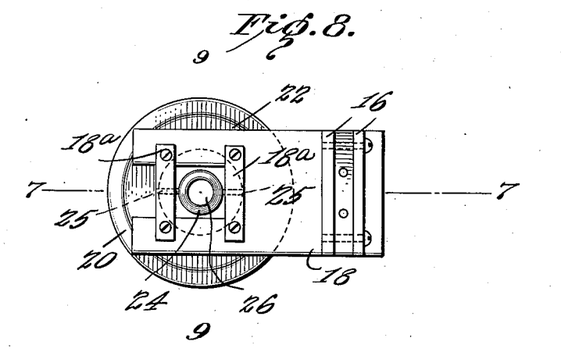
Fig. 8 is a detached detail bottom plan of a portion of the operative connection between the work holder roller carriage and the cutter head, and the presser foot carried by said connection.
Figure 9:
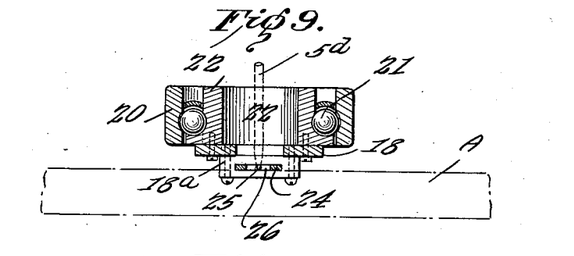
Fig. 9 is a detail vertical section taken in a plane at right angles to the plane of the sectional view Fig. 7.
Figure 10:
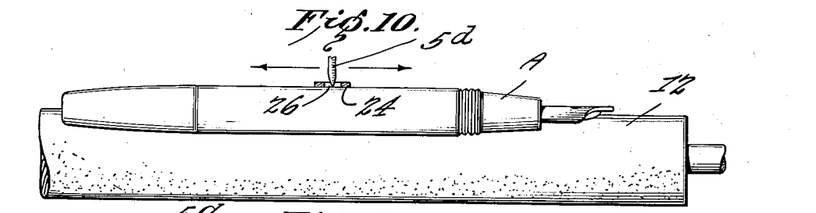
Fig. 10 is a detail diagrammatical view illustrating the position of the presser foot, cutter, work, and rollers, when the cutter is operating on the cylindrical portion of elongated work.
Figure 11:
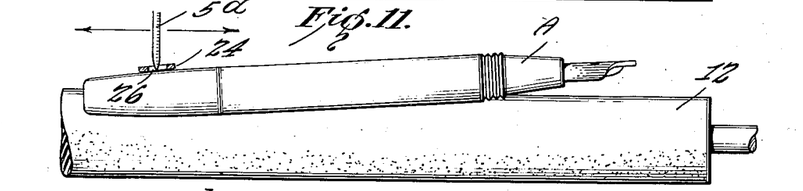
Fig. 11 is a view somewhat similar to Fig. 10, showing the positions of the cutter, presser foot, and rolls when the cutter is working on the longitudinally tapered portion of cylindrical work.
Figure 12:
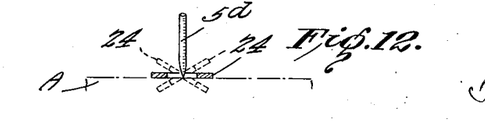
Fig. 12 is a diagram indicating various positions that can be assumed by the presser foot without varying the cutting depth of the cutter.

In the drawings, I more or less diagrammatically illustrate the cutter head 3, of any suitable type of pantograph engraving or other machine capable of performing the functions of or of being adapted to embody my invention. This cutter head carries and supports a vertical rotary cutting spindle having longitudinally alined depending cutting point or cutter 5d.

The cutter spindle and its alined cutter 5d, are shown as driven by pulley 5e, to be driven by any suitable belt drive, although my invention is not so limited.

This cutter head with its vertical cutter, is universally movable in lateral directions or is subject to universal lineal movements in a plane or planes to which the longitudinal axis of the cutter is perpendicular, as the cutter operates on the work. The cutter head is controlled and actuated on said linear movements, usually, by any suitable pantograph system 1, diagrammatically indicated in the drawings, which can be pivotally coupled to the cutter head on a vertical axis 4, or otherwise, to control and propel said cutter head on its lineal movements. This pantograph can be pivotally supported from the machine frame on a vertical axis and is provided with an operating arm or handle that usually extends and is horizontally movable over a horizontal copy holder for the copy to be traced by a vertical stylus carried by said horizontal operating arm or handle.

In pantograph engraving machines of this common type, the cutter head is usually supported for said universal lineal movements in a horizontal plane, by a pair of jointed horizontally swingable links, indicated at 2, supported from the main frame on a vertical axis, with the free end of the outer link forming the relatively fixed vertical tubular housing 3, of the cutter head.

A vertical longitudinally slidable cutter spindle barrel or slide 5, extends longitudinally and slidably through the housing 3, and is held therein against rotary movement on its longitudinal axis, while free to float vertically on or from the work, under the action of gravity assisted if need be by contractile spring 5', applied at one end to housing 3, and at the other end to said barrel to exert downward pull on the barrel.

The vertical cutter spindle is mounted to rotate in this barrel with its longitudinal axis, usually, alined with the longitudinal axis of the barrel. The cutter spindle is carried vertically with and by the barrel, although a cutter feed is usually provided for longitudinally feeding the cutter to its working depth and for retracting the same, longitudinally of the barrel and means for setting the working depth of the cutter with respect to the barrel, all of which are common practice in engraving and allied machinery.

I happen to show the barrel 5, carrying an approximately U-shaped bracket 5a, that moves vertically therewith, and this bracket has an upright body arranged exteriorly and longitudinally of cutter head housing 3.

I have diagrammatically indicated any suitable preferably vertically adjustable work supporting table 6, located below the cutter head.

I have by the foregoing description briefly indicated an old and common type of engraving machine, from among other engraving and allied machines to which my invention can be adapted and in which it can be embodied.

To render an engraving or related machine, say, one of the type disclosed hereby, capable of reproducing copy circumferentially around and/or spirally around as well as longitudinally of the exterior surfaces of elongated substantially cylindrical pieces of work, by the action of the cutter on the circumferential or peripheral surface of the work, where the cutter is perpendicular to the work and located in the same vertical plane as the work longitudinal axis, I have produced a work holder and provided a cooperative relation or operative connection between the work holder and the cutter head or its rotary cutter spindle whereby during each engraving operation on such a piece of work, the rotary cutter moves with respect to the work or relatively on its lateral movements that are longitudinal with respect to the work, and the work holder bodily rotates or turns such piece of work on its longitudinal axis with respect to the rotary cutter by the lateral movements of the cutter head and the cutter that are transversely of the longitudinal axis of the work or at an angle to those lateral movements which are in directions longitudinal of the work, and whereby on lateral cutter head movements that are both transverse and longitudinal with respect to the axis of the work or angular with respect to said transverse and longitudinal movements, the work will be proportionally rotated or turned on its axis and the cutter will have relative proportional angular movement longitudinally of the work; and whereby the work holder and cutter head or associate parts will co-operate in holding the work in operative relation to the cutter and work holder, and whereby the work can be easily and conveniently applied to and removed from the work holder preparatory to and on completion of an engraving operation.

As an example of a work holder from among others that embody my invention, I show a work holder carriage 10, mounted on the work table or on a base or support 11, fixedly secured to said table, for straight line reciprocation in a horizontal plane parallel with the horizontal plane in which the working point of the rotary cutter is universally movable laterally by the pantograph while its stylus is tracing the copy. This straight line movement of the carriage is perpendicular or at right angles to the longitudinal axis of the substantially cylindrical elongated piece of work A, arranged horizontally in the carriage. The piece of work A, is hence, in this example, arranged transversely in the carriage with respect to the straight line path of travel of the carriage.

This carriage is provided with any suitable means for receiving and holding the elongated approximately cylindrical work in a fixed location in and with respect to the carriage transversely of the path of carriage movement with the longitudinal topmost surface line of the work exposed in operative relation to the working point of the rotary cutter. Means are also provided whereby the rectilinear movement of the carriage is converted into rotary movement of the work on its longitudinal axis. For instance, the work holding means can provide a downwardly-contracting horizontal depending bight or trough open at the top and extending transversely across the carriage intermediate the front and rear of the carriage, so that the work can be deposited in such trough from the top and will be held therein and properly positioned thereby longitudinally thereof, with its uppermost top longitudinal surface exposed to receive the rotary cutter, and this trough preferably presents more or less resilient or friction surfaces to frictionally or somewhat yieldingly contact opposite longitudinal portions of the approximately cylindrical surface of the work below the exposed top line of the work. Means are provided whereby the work is held in a stationary position while the carriage is at rest, but when the carriage is moved in either direction on its straight line path of movement, the opposite walls of such trough will be caused to travel, one up and the other down, and the work will consequently be turned on its longitudinal axis, in one direction when the carriage moves rearwardly and in the opposite direction when the carriage moves forwardly. This work rotating movement of the work holder, is accomplished by the cooperating action or operative connection between the work holder and the stationary track or bed along which the carriage is moved by an operative connection with the vertical laterally-movable cutter head and/or its rotary cutter spindle.

As exceedingly simple and efficient means for this purpose, although I do not wish to limit the generic features of my invention to such specific species, I show a pair of similar cylindrical parallel spaced rolls 12, extending horizontally across the open-frame of the carriage between the opposite side bars thereof and provided with end pintles or shaft ends 12a, journalled in said side bars. These parallel rolls are so spaced as to form the hereinbefore described horizontal open top downwardly-contracting longitudinal work receiving trough or bight, by the juxtapositioned facing upper 90° circumferential surfaces of the two rolls located above the horizontal plane common to the two roll axes and between the parallel vertical planes of the two roll axes, respectively. The two rolls have frictional circumferential surfaces frictionally engaging the work surface engaged thereby for rotating or turning the work without slipping and for holding the work against objectionable slipping when the rolls are at rest, and for frictionally engaging the surface of a relatively fixed rail, bed or platen 14 without slipping to hold the rolls against normal movement when the carriage is at rest and for causing rotation of the rolls when the carriage is moved relatively to said bed, platen or rail.

For instance, I can employ rolls 12, having at least their circumferential surfaces composed of more or less soft resilient vulcanized rubber or its equivalent, and I have in actual practice found that resilient rubber rolls 12, supply the desired friction holding and driving surfaces.

In the particular example illustrated, the work carriage 10, is supported and carried by the parallel transverse rolls 12, which frictionally-engage, rest and roll on a flat horizontal forwardly and rearwardly extending stationary bed, platen or rail 14, having a preferably frictional flat top surface with which the circumferential surfaces of rolls 12, will cooperate to cause rotation of said rolls when the carriage is propelled forwardly or rearwardly. In the particular example shown, the platen or rail 14, is rigid with base 11, clamped or otherwise stationarily held on the machine bed 6.

In the example shown, the horizontal plane common to the uppermost top longitudinal portions of the circumferences of the two rolls 12, is above the top edges of the sides and rear end of the carriage frame, while the common horizontal plane of the lowermost bottom longitudinal portions of said two rolls is below the front and rear cross portions of the carriage frame, and any suitable means are provided to guide and confine said carriage to its straight line path of travel in either direction forwardly or rearwardly in a line perpendicular to the longitudinal axes of the rolls and the piece of work. For instance, as an example, I show the bed 14, providing parallel fixed guide or stop edges 14a, extending throughout the length thereof from front to rear, located between guides 10a, rigid with and depending from the side bars of the carriage frame and having vertical faces in free sliding engagement with the adjacent vertical faces of said edges 14a, for holding the carriage to its straight line path while permitting free forward and rearward movement thereof when so impelled by the cutter head.

Any suitable cooperative connection is established between the work carriage and the cutter head to actuate the carriage either forwardly or rearwardly and thus cause rotation of the rolls 12, and the work, on all lateral movements of the cutter head that are forwardly or rearwardly, i. e. in directions transversely with respect to the longitudinal axis of the work, and to permit the cutter head to move independently of or with respect to the carriage and work on all lateral movements that are longitudinally of the work or transversely of the carriage or perpendicular to the straight line of movement of the carriage, and to cause simultaneous forward or rearward movements of the carriage and proportionate longitudinal movement of the cutter head along the work, on diagonal lateral movements of the cutter head at an angle to both the straight line carriage movement path and the longitudinal axis of the work.

Furthermore, this operative connection between the cutter and the straight-line movement roller carriage, is designed to accurately locate and maintain the position of the cutter centrally between the two work holding and centering rollers with the longitudinal axis of the working point of the cutter in the same vertical plane as the longitudinal axis of the work, and with said cutter axis perpendicular to said work axis.

For instance, as an example, I show a horizontally disposed arm arranged transversely of the rollers and parallel with the straight path of movement of the work carriage at one end positively connected to the cutter spindle barrel to move therewith horizontally in any direction and at its opposite end positively coupled to the carriage to push and/or pull the same by the lineal movements of said cutter spindle barrel and cutter that are at right angles to the longitudinal axis of the work, so that such carriage movement will in length equal such barrel movement, and slide freely along the carriage in a direction parallel with said work axis when said cutter spindle barrel moves laterally in directions parallel with the longitudinal axes of the work and the carriage rollers.

For instance, I show the rear end of the carriage throughout the length thereof provided with a rigid straight upstanding guide edge 17, longitudinally parallel with the axes of the carriage rollers, and the rear or free end of said operative connections or arm formed or provided with a depending fork 16, straddling said edge from above with a sufficiently snug fit to accurately push and pull the carriage, yet with sufficient looseness to freely slide longitudinally along said edge or flange 17, on lineal movement of the spindle barrel in directions parallel with said edge 17. The depending fork 16, in the example shown, is rigid with a horizontal arm 18, extending forwardly above the work carriage at right angles to carriage edge 17, and the front end of this arm 18, is pivotally connected against relative vertical movement by a vertical axis longitudinally alined with the cutter axis, to a horizontal member 19, that is fixed to the cutter spindle barrel 5, through the medium of a normally fixed depending portion of the bracket 5a, that is secured to, carried by and moves vertically with the cutter spindle barrel.

In this specific form to which my invention is not limited, the member 19, embodies the outer annular runway or ring 20, of a radial and end thrust ball bearing 21, and this ring 20, is horizontally arranged directly below the lower end of cutter spindle barrel 5, with the ring concentric with the longitudinal axis of the cutter which depends centrally through said horizontal ball bearing with its working point adapted to depend to full working depth at a level below the bottom face of said bearing. The ring 20, is by any suitable means rigidly fixed to said front depending portion of bracket 5a, and extends horizontally and rearwardly therefrom.

The inner raceway annulus or ring 22, or said ball bearing is concentrically arranged within the outer ring 20, and its open center is of ample diameter for the free operation of the cutter that is located centrally therein and depends therethrough.

The arm 18, is fixed to the lower end of said inner ring 22, and projects rearwardly radial therefrom.

The annular rings 20, 22, and the intervening balls maintain the members 18, 19, against relative vertical movements, and yet permit relative turning or rotary movement of the cutter head and member 19, with respect to ring 22, and arm 18, on an axis alined with the cutter axis.

The member 18, 22, of the operative connection between the spindle barrel and the roller carriage is provided with any suitable depressed depth stop finger or presser foot having a bottom contact face to slidably engage and press down on the work held by the carriage rollers, preferably in the vertical plane of the longitudinal axis of the work and closely adjacent to the working point of the cutter 5d, operating in the peripheral or circumferential surface of said work.

This pressure foot contacts the work at a fixed distance below the spindle barrel to limit the downward movement of the barrel and of the cutter when said cutter is set for its full predetermined working depth, and furthermore the presser presses the cylindrical or long round work into centering and non-slipping frictional contact with the two rollers, and also aids to hold the two rollers down to frictional non-slipping rolling contact with the flat surface that supports the carriage. As an example from among others, I show the underside of the slotted portion of the member 18, provided with spaced depending bearing blocks, 18a, rigid with member 18, and arranged below the vertical center opening of the inner ring 22, in such manner that the cutter 5d, extends downwardly centrally between said blocks. A horizontal rockable thin flat plate presser foot 24, is arranged between said blocks 18a, and is supported therefrom by alined trunnions 25, mounted therein, and the plate 24, is formed with a central vertical opening 26, through and below which the cutter point projects when in position to operate on the work to the depth to which it has been set. The axis 25, on which this presser foot is rockable is alined with the straight line path of movement of the roller carriage and is transverse with respect to the longitudinal axis of the work, and hence the presser foot extends transversely across the top of the cylindrical work when its smooth bottom face is seated thereon and the axis on which the presser foot plate is rockable is also located transversely of the work and in the same plane as the plate. This fact is of peculiar advantage when cylindrical work with a longitudinally tapered portion, is being operated on.

With such work, the presser foot will be in a horizontal position while sliding along the top line of the cylindrical portion of the work, but when it runs onto the tapered portion, the presser foot rocks on its axis to the angle of the taper and to parallelism with the top longitudinal line of the taper, and because the axis of the foot is in the plane of the foot plate and intersects the perpendicular axis of the cutter, the cutting depth of the cutter is not varied from that when the foot is in flat horizontal position. When the pressure foot thus travels longitudinally onto longitudinally tapered portion of otherwise substantially cylindrical work, the downward pressure of the foot usually rocks the work to lift the cylindrical portion and depress the tapered end into non-slip frictional engagement with the rollers, without necessity of stopping the machine and adjusting parts, so that the cuts in the longitudinal tapered portion of the work will be of uniform depth with those in the cylindrical portion of the piece of work that has the tapered end.

It is a desirable peculiarity of the roller carriage operatively coupled to the vertical laterally movable cutter, that on lineal movements of the cutter that are transverse with respect to the longitudinal axes of the rollers and work, the length of the straight line movement of the carriage is the same as said lineal movement of the cutter, and the length of the rotating peripheral surface movement of the work is the same as the length of said lineal movement of the cutter and these movements are made at the same speed.

In the particular form shown, as an example, the cylindrical or round work is placed down in the trough formed by the two rollers, from above, so as to lie longitudinally, while the work table 6, is in a lowered position. This table is then elevated to operative position with respect to the cutter and its barrel, and during this upward adjustment of table 6, the upstanding carriage straight edge 17, will enter the depending relatively-short coupling fork 16, of the barrel to carriage coupling connection 18, 19, to establish the operative connection from the cutter spindle to the work roller carriage.

It is also a desirable peculiarity of this organization that the distance of peripheral travel of the work surface when the work is thus rotated by the lateral travel of the cutter in a direction transversely of the work, is the same as the distance the cutter travels laterally and at the same speed, and that these facts are true regardless of the diameter of the work, within the capacity of the particular organization.

I do not wish to limit the generic features of my invention to the particular species disclosed herein which is given for purposes of explanation and not for purposes of limitation beyond that necessary to patentably distinguish the claims from the prior art, as it is my desire to cover my invention both generically and specifically as broadly and fully as is legally possible, and hence;—

What I claim is:—

1. In engraving and related machines, a cutter head, universally movable laterally over the work in reproducing copy on the work during an engraving operation; a work rotating and supporting holder movable in either direction along a straight line, means being provided actuated by said straight line movements of said holder whereby the work is rotated while supported and carried by said holder; and an operative connection between said cutter head and said work holder for actuating said work holder on its straight line movements by lateral movements of said head in directions longitudinally with respect to said path of movement of the work holder, said connection being free to permit straight line lateral movements of said cutter head transversely with respect to said path of work holder movement independent of and along the work and with respect to said work holder.

2. In engraving and related apparatus, work carrying and turning means for holding an elongated piece of work exposed to the action of an engraving cutter both longitudinally and transversely along the circumferential surface of the work and also for turning the work on its longitudinal axis; a rotary cutter spindle supported independently of said means and universally movable laterally during an engraving operation with its rotary cutter in operative engraving relation to the circumferential surface of the work; stylus and pantograph mechanism for actuating and controlling said spindle on its said lateral movements; and mechanism whereby said cutter moves longitudinally along and with respect to the work on lateral movements of said spindle that are longitudinally of the work and whereby said means is actuated to turn the work with respect to said cutter by lateral movements of said spindle that are transverse to the longitudinal axis of the work.

3. In engraving and related apparatus; a cutter head provided with a cutter spindle universally movable laterally; a work holder carriage supported independently of said cutter head and confined to movement in either direction along a straight line, including a holder for rotating the work and capable of holding the work in a stationary position; means for actuating said holder to rotate the work by movement of the carriage in either direction along said path; and an operative connection between said cutter head and said carriage operative only for moving said carriage on its path by and with lateral movements of said spindle in either direction longitudinally of said path, said connection leaving said spindle free of said carriage for lateral spindle movements transversely with respect to said path of carriage movement and independently of the carriage and work.

4. In engraving and related apparatus; a cutter head universally movable laterally and providing a cutter spindle perpendicular to the work and a member to engage the work surface adjacent to the point of the cutter with a sliding contact; work supporting and rotating means to hold a piece of elongated work with its circumferential surface exposed to operative contact with said member and cutter point along a line longitudinally of said surface, said member holding said work down to operative engagement with said means, said means being capable of rotating said piece of work on its longitudinal axis with respect to said member and cutter while bodily carrying said piece of work laterally in a fixed plane; said cutter spindle and member being free to move laterally longitudinally along and with respect to said work on lateral movements in either direction that are longitudinal of the work; and mechanism operated by lateral movements of said spindle in either direction that are transversely with respect to the longitudinal axis of the work to actuate said means to rotate the work with respect to the cutter and said member; said mechanism maintaining the operative lateral positioning of the cutter spindle with respect to the longitudinal line of the work surface along which the cutter operates on the work.

5. In engraving and related apparatus; a bed; a carriage having a straight line path of movement along said bed; means being provided confining said carriage to said path of movement; a work holder arranged transversely of said carriage and operative to bodily support and rotate the work on its longitudinal axis, means being provided whereby said holder is actuated to rotate the work bodily carried thereby by the relative straight line movement of said carriage along said bed; and a cutter head having a cutter spindle perpendicular to the work, said head having means to cooperate with said holder in pressing the work thereto, said head universally movable laterally; and an operative connection between the cutter head and said carriage for moving the carriage on its path by and with said head on lateral movements of said head that are in directions longitudinally of said path, said head being movable independently of said carriage and with respect to the work on its lateral movements that are in directions transversely of said carriage path of movement.

6. In engraving and related apparatus; a bed; a carriage confined to a straight line path of movement on said bed; said carriage providing an elongated horizontal open-top depending work-holding trough embodying approximately downwardly converging friction surfaces to frictionally contact and hold and center a piece of work arranged longitudinally in said trough; means being provided to cause said friction surfaces to travel in opposite directions to rotate the work held by said trough by the relative movement between the carriage and bed when the carriage travels in either direction on its said path; and a cutter head provided with a cutter spindle having a cutter to operate on said work held in said trough, said head being universally movable laterally in reproducing copy on the work by the action of its cutter, means operatively coupling said head to said carriage to propel the same in either direction on its path of movement.

7. In engraving and related apparatus; a bed; a carriage confined to a definite path of movement on said bed; a pair of carriage supporting rolls mounted in said carriage and adapted to travel on and rotate along said bed and providing a work holding and rotating trough for an elongated piece of work; a laterally-movable cutter head provided with a cutter spindle for a cutter to operate on said work; and an operative connection from said head to said carriage to move the carriage in either direction on its definite path on said bed, said connection being freely movable with respect to and independently of said carriage when the head moves laterally in directions transversely of said definite path.

8. In an engraving or related machine; a bed; a work holder carriage confined to movement in either direction in a straight line on said bed; a pair of adjacent parallel rolls having resilient friction circumferential surfaces resting and adapted to roll on said bed and mounted in and supporting said carriage and providing a top work holding and rotating trough longitudinally of said rolls to longitudinally receive and hold work to be operated on by an engraving cutter; and a laterally-movable cutter head carrying the engraving cutter and its spindle; said head being laterally movable in certain directions with respect to said carriage and the work; said head being operatively connected to said carriage to move the same in either direction on its said path of movement.

9. In engraving and related machinery; a bed; a carriage movable on said bed and providing an elongated work holding and rotating trough, means being provided whereby the work is rotated by the relative movement between the bed and carriage; said carriage providing an elongated guide; and a laterally movable cutter head provided with the cutter spindle for the cutter to operate on the work held by said trough, said head operatively coupled to said carriage through the medium of said guide to push or pull the carriage on said bed when said head moves laterally in directions transversely with respect to said guide, said connection being freely slidable longitudinally of said guide and with respect to the carriage when said head is moved laterally in directions longitudinally with respect to said guide.

10. In engraving and related machinery; a bed; a work holder carriage movable forwardly and rearwardly on said bed and providing and carrying means for holding and bodily supporting the work independently of said bed and for rotating the work actuated by said movements of the carriage on the bed; and a laterally movable cutter head providing means to bear on the work in said holder with a sliding surface contact and provided with a rotary spindle for the cutter to operate on the work; said head being laterally movable relatively to said carriage and the work; and means operatively coupling said head to said carriage to propel the same forwardly and rearwardly when the head moves laterally forwardly and rearwardly.

11. In combination; a cutter spindle barrel provided with a cutter universally laterally movable in a plane to which the longitudinal cutter axis is perpendicular; said barrel having a depth stop presser foot for slidably bearing down on approximately round elongated work, said presser foot being rockable on an axis approximately included in the plane of the foot and transversely arranged with respect to the work, said axis of said foot being intersected by the longitudinal axis of the cutter; and means for holding the work with its longitudinal axial line in the same plane as the longitudinal axis of the cutter.

12. In an organization for reproducing indicia and designs transversely, spirally and/or longitudinally of the circumferential surface of elongated approximately round work; in combination; a work holder including a pair of spaced parallel friction surface rollers of like diameter providing a top trough to longitudinally receive and center elongated work with a substantially non-slip friction grip and to rotate the work regardless of the diameter of such work when the rollers are simultaneously rotated in the same direction; a track having a friction surface in frictional substantially non-slip engagement with said rolls to simultaneously rotate said rolls by relative movement between said track and said rolls; and a cutter spindle for the cutter to operate on the surface of the work.

13. In an organization for etching, cutting, marking or otherwise engraving indicia and designs on the circumferential surface of approximately cylindrical work; a vertically movable cutter spindle movable laterally in a horizontal plane; means for holding elongated work with its longitudinal axial line perpendicular to and intersected by the longitudinal line of said spindle; and a depth stop presser foot for pressing said work down to operative engagement with said holding means, said foot being movable vertically and laterally with said spindle whereby said spindle and its foot float on the work, said foot including a transverse flat plate centrally perforated for the cutter and having its bottom face slidably contacting the topmost longitudinal portion of said work and being relatively rockable on an axis perpendicular to and intersecting the vertical plane of the longitudinal axis of the work to follow cylindrical and longitudinally tapered portions of the work.

14. In engraving machinery, a longitudinally-floating vertical cutter spindle having means yieldingly forcing the same downwardly, said spindle being universally movable laterally and provided with a cutter depth stop presser foot movable vertically and laterally with said spindle and having a transverse flat bottom face to slidably contact the topmost longitudinal line of the work closely adjacent to and surrounding the working point of the cutter, and to float the foot and cutter on said work; in combination with means to hold approximately cylindrical work with the plane that includes its longitudinal axis also approximately including the longitudinal axis of said spindle and intersecting said bottom face.

15. An engraving machine having a cutter spindle, and a depth stop presser foot movable vertically and laterally with said spindle and including a relatively rockable foot plate perforated for the free passage of the cutter of said spindle and having a bottom face to slidably bear down on and contact the work surface, said plate having alined supporting pintles on which said plate is rockable on a transverse axis perpendicular to and intersecting the longitudinal axis of said spindle.

16. An organization for etching, marking, cutting or otherwise engraving indicia and designs in the work surface, including a cutter spindle provided with a depth stop presser foot movable vertically and laterally with said spindle and including a member normally arranged in a plane at right angles to and approximately centrally intersected by the longitudinal axial line of said spindle and having an opening for the passage of the cutter of said spindle, said member being relatively rockable on an axis at right angles to and intersecting said axial line of the spindle to conform to the angle of the work surface on which said member rests, said member having a smooth surface for slidably contacting the surface of the work being operated on by said cutter, said spindle being longitudinally movable and provided with means yieldingly depressing the same longitudinally to hold down the work by said foot; in combination with a work holder with respect to which said spindle is relatively movable longitudinally of the work, said holder embodying rollers forming a trough for receiving and rotating the work, and means whereby said rollers are operated to rotate the work by lateral movements of said spindle transversely with respect to the axes of said rollers, said foot pressing the work down to operative position on and between said rollers.

17. An organization for engraving the surface of cylindrical and approximately round elongated work, including a cutter spindle movable laterally and longitudinally and provided with a depth stop presser foot movable longitudinally and laterally therewith and having a member with a surface to slidably bear down on the surface of the work to be operated on marked by the cutter of said spindle, said member being rockable only on an axis at right angles to and intersected by the longitudinal axial line of said cutter of the spindle; and means for holding such work with its longitudinal axis and said axis of the cutter in a common plane intersected at right angles by the plane in which said axis of said foot is located.

18. In an engraving machine, a cutter head universally movable laterally and including a rotary cutter spindle; a work holding carriage including means for holding elongated work stationary and for rotating such work on its longitudinal axis on movement of the carriage; means associated with said work holding means for rotating the work on carriage movement and an operative connection between the cutter head and said carriage for moving the carriage to rotate the work by certain definite lateral movements of said head and to permit the carriage to remain at rest on other definite lateral movements of the head, said operative connection including means providing a vertical axis alined with the longitudinal axis of said spindle, for relative axial movements between said operative connection and said cutter head.

19. In combination; a laterally movable cutter; a laterally movable pantograph provided with a copy tracing stylus and controlling the lateral movements of the cutter in scaled relation to the copy tracing movements of the stylus; a travelling work holder for bodily holding carrying and rotating the work, and providing a work receiving trough including opposing work contacting walls adapted to correspondingly travel in opposite directions for rotating the work; and means controlled by lateral movements of said cutter transversely with respect to the longitudinal axis of said trough for causing travel of said holder, and said travel of the walls for rotation of the work within said trough.

20. In combination, a cutter supported for universal lateral movements in a plane perpendicular to the longitudinal axis of said cutter; a holder for bodily upholding, carrying and maintaining the work with its longitudinal axis perpendicular to the axis of the cutter and with said axes of the work and cutter in a common vertical plane; means for maintaining the cooperative relation between said cutter and the work with their said axes in said common vertical plane, throughout the universal lateral movements of said cutter during an engraving operation on said work, and whereby said cutter is relatively movable with respect to said work longitudinally of the work axis; said holder being movable in a straight line transversely of the longitudinal axis of the work under the control of said cutter and said means; said holder including an open-top work holding and rotating trough adapted to work of different diameters, said trough providing work contacting surfaces correspondingly movable in opposite directions for rotating said work in either direction on its longitudinal axis; and cooperating means for causing said work rotating travel of said surfaces as said holder is moved with the cutter transversely with respect to said work axis.

21. In combination; a cutter universally movable laterally; a laterally movable pantograph provided with a copy tracing stylus and controlling said lateral movements of the cutter in reducing scaled relations to the copy tracing movements of the stylus; a carriage; a bed on which said carriage is confined to straight-line movement in either direction; said carriage providing a holder for the work adapted to bodily carry, support and rotate the work above and out of contact with said bed, and to maintain the work in operative relation to said cutter during an engraving operation, means being provided for rotating the work independently of said bed during said straight-line movements of said carriage, and means controlled by the lateral movements of said cutter that are parallel or alined with the straight line movements of said carriage, for propelling and controlling said carriage on its said straight-line movements, and whereby said carriage remains at rest during lateral movements of said cutter angularly with respect to said straight-line movement of said carriage.

22. In combination; a cutter supported for universal lateral movements in a plane perpendicular to its axis; a support; a work carriage confined on said support for straight-line travel in either direction and providing a holder for bodily upholding, carrying and rotating the work on its longitudinal axis above and free from said support, said holder adapted to hold and maintain the work with its longitudinal axis perpendicular to and in a common vertical plane with said cutter axis; means for maintaining the cooperative relation between said cutter and the carriage and its work holder with the said axes of the cutter and work perpendicular to each other and in said common plane, throughout the lateral movements of said cutter during an engraving operation on said work, and whereby said cutter is relatively movable longitudinally of said work on cutter lateral movements transversely with respect to the straight-line path of travel of said carriage; said means cooperating with the cutter and carriage to propel the carriage with the cutter on cutter lateral movements that are parallel or alined with said straight-line path of carriage travel, means being provided whereby said work is rotated on its longitudinal axis during said travel of the carriage.

23. An engraving machine particularly adapted for engraving on a work element of rounded cross section, comprising a support for said work element, said support including a roller element for contacting with said work element, track means including a flat surface in direct contact with that side of one of said elements which is remote from the other of said elements, and means for producing relative movement between said one of said elements and said track means and thereby turning said work element to present a different portion thereof to an engraving tool.

24. An engraving machine particularly adapted for engraving on a work element of rounded cross section, comprising a roller element for operative association and contacting with said work element, track means including a flat surface in direct contact with that side of one of said elements which is remote from the other of said elements, and means for producing relative movement between said one of said elements and said track means and thereby turning said work element to present a different portion thereof to an engraving tool.

25. An engraving machine particularly adapted for engraving on a work element of rounded cross section, comprising a roller element, and associated means, for contacting with and supporting said work element; track means including a flat surface in direct contact with that side of one of said elements which is remote from the other of said elements; and means for producing relative movement between said one of said elements and said track means and thereby turning said work element to present a different portion thereof to an engraving tool.

26. An engraving machine particularly adapted for engraving on a work element of rounded cross section; including track means; rolling means for contacting, and supporting said work element remote from said track means; said rolling means being in operative contact with said track means for turning said work element to present a different portion thereof to an engraving tool, as the result of relative movement between said track means and said rolling means; and means for producing said relative movement between the rolling means and the track means.

27. An engraving machine work holder particularly adapted for a work element of rounded cross section, comprising a roller element for operatively contacting with said work element, track means for operative contact with a portion of one of said elements which is remote from the other of said elements, and means for producing relative movement between said one of said elements and said track means and thereby turning said work element to present a different portion thereof to an engraving tool.

28. An engraving machine particularly adapted for engraving on a work element of rounded cross section, comprising a roller element for contacting with and supporting said work element, track means including a flat surface in direct contact with that side of one of said elements which is remote from the other of said elements, and means for producing relative movement between said one of said elements and said track means and thereby turning said work element to present a different portion thereof to an engraving tool.

29. An engraving machine particularly adapted for engraving on work capable of being rolled, comprising a track and a tool carrier mounted for movement relatively to each other, a work supporting truck movable relatively to said track, said truck including a plurality of rollers rolling on said track, on which rollers said work is adapted to rest and roll, and means operatively connected to said tool carrier for causing relative movement between said truck and said track, thereby causing said rollers to turn by contact with said track and causing said work to turn by contact with said turning rollers.

30. An engraving machine particularly adapted for engraving on work capable of being rolled, comprising a track and a tool carrier mounted for movement relatively to each other, a work supporting truck movable relatively to said track, said truck including a plurality of rollers rolling on said track, on which rollers said work is adapted to rest and roll, and depth limiting means mounted on said tool carrier and movable bodily therewith, for contacting with said work to limit the extent to which an engraving tool mounted on said tool carrier may penetrate the work.

31. In engraving and related apparatus; a cutter head universally movable laterally and providing a cutter spindle perpendicular to the work and a member to engage the work surface adjacent to the point of the cutter with a sliding contact; work supporting and rotating means to hold a piece of elongated work with its circumferential surface exposed to operative contact with said member and the cutter point along a line longitudinally of said surface, said member holding said work down to operative engagement with said means, said means being capable of rotating said piece of work on its longitudinal axis with respect to said member and cutter while bodily carrying said piece of work laterally; said cutter spindle and member being free to move laterally longitudinally along and with respect to said work on lateral movements in either direction that are longitudinal of the work; and mechanism operated by lateral movements of said spindle in either direction that are transversely with respect to the longitudinal axis of the work to actuate said means to rotate the work with respect to the cutter and said member; said mechanism maintaining the operative lateral positioning of the cutter spindle with respect to the longitudinal line of the work surface along which the cutter operates on the work.

32. In engraving and related apparatus; a bed; a carriage having a straight line path of movement along said bed; means being provided confining said carriage to said path of movement; a work holder arranged transversely of said carriage and operative to bodily support and rotate the work on its longitudinal axis, means being provided whereby said holder is actuated to rotate the work bodily carried thereby by the relative straight line movement of said carriage along said bed; and a cutter head having a cutter spindle perpendicular to the work, said head having cutter depth stop presser foot means to travel longitudinally on the work and to cooperate with said holder in pressing the work thereto, said head universally movable laterally; and an operative connection between the cutter head and said carriage for moving the carriage on its path by and with said head on lateral movements of said head that are in directions longitudinally of said path, said head being movable independently of said carriage and with respect to the work on its lateral movements that are in directions transversely of said carriage path of movement.

33. In engraving and related apparatus; a bed; a carriage confined to a straight line path of movement on said bed; said carriage providing an elongated horizontal open-top depending work-holding trough embodying approximately downwardly converging friction surfaces to frictionally contact and hold and center a piece of work arranged longitudinally in said trough; means being provided to cause said friction surfaces to travel in opposite directions to rotate the work held by said trough by the relative movement between the carriage and bed when the carriage travels in either direction on its said path; and a cutter head provided with a cutter spindle having a cutter to operate on said work held in said trough, said head being universally movable laterally in reproducing copy on the work by the action of its cutter, and means operatively coupling said head to said carriage to propel the same in either direction on its path of movement.

34. In engraving and related apparatus; a bed; a carriage confined to a definite path of movement on said bed; a pair of carriage supporting rolls mounted in said carriage and adapted to travel on and rotate along said bed and providing a work holding and rotating trough for an elongated piece of work capable of being rotated by said rolls; a laterally-movable cutter head provided with a cutter spindle for a cutter to operate on said work; and an operative connection from said head to said carriage to move the carriage in either direction on its definite path on said bed, said connection being freely movable with respect to and independently of said carriage when the head moves laterally in directions transversely of said definite path.

35. In an engraving or related machine; a bed; a work holder carriage confined to movement in either direction in a straight line on said bed; a pair of adjacent parallel rolls having friction circumferential surfaces resting and adapted to roll on said bed and mounted in and supporting said carriage and providing a top work holding and rotating trough longitudinally of said rolls to longitudinally receive and hold and rotate work to be operated on by an engraving cutter; and a laterally-movable cutter head carrying the engraving cutter and its spindle and provided with a cutter depth stop foot to travel on said work closely adjacent to said cutter to depress the work against said rolls; said head being laterally movable in certain directions with respect to said carriage and the work; said head being operatively connected to said carriage to move the same in either direction on its said path of movement.

36. In engraving and related machinery; a bed; a work holder carriage movable forwardly and rearwardly on said bed and providing carrying means for holding and bodily supporting the work and for rotating the work, actuated by said movements of the carriage on the bed; and a laterally movable cutter head providing presser means to bear on the work in said holder with a sliding surface contact, and also provided with a rotary spindle for the cutter to operate on the work in close proximity to said presser means; said head being laterally movable relatively to said carriage and the work, and means operatively coupling said head to said carriage to propel the same forwardly and rearwardly when the head moves laterally forwardly and rearwardly.

37. In an organization for reproducing indicia and designs transversely, spirally and/or longitudinally of the circumferential surface of elongated approximately round work; in combination; a work holder including a pair of spaced parallel friction surface rollers of like diameter providing a top trough to longitudinally receive and center elongated work with a substantially non-slip friction grip and to rotate the work regardless of the diameter of such work when the rollers are simultaneously rotated in the same direction; a track having a surface in frictional substantially non-slip engagement with said rolls to simultaneously rotate said rolls by relative movement between said track and said rolls; and a cutter spindle for the cutter to operate on the surface of the work.

38. An engraving machine particularly adapted for engraving on a work element of rounded cross section, including track means; rolling means for contacting and supporting said work element remote from said track means; said rolling means being in operative contact with said track means for turning said work element to present a different portion thereof to an engraving tool, as the result of relative movement between said track means and said rolling means; and means for producing said relative movement between the rolling means and the track means.

39. An engraving machine, comprising track means; mechanism relatively movable with respect to said track means, for holding a work element adapted to be rotated on its longitudinal axis and presenting a longitudinal taper, with the topmost portion of the longitudinal surface of said element including said taper, exposed for engraving, said mechanism including a roller element for operative contact with said work element and the taper thereof, said track means adapted to operatively contact that side of one of said elements which is remote from the other of said elements; a laterally movable engraving tool carrier operatively associated with said mechanism to cause relative movement between the same and said track means for causing rotation of said elements by movements of said carrier that are transverse to the axis of said work element; a depth stop movable laterally and vertically with said carrier to contact the topmost longitudinal surface portion of said work element in close proximity to the working end of the engraving tool and to travel longitudinally along said work element surface portion to depress said work element laterally against said roller element; and spring means acting to cause opposing relative lateral pressure movement between said depth stop and said roller element to force said work element laterally against said roller element and said roller element toward said track means.

40. An engraving machine particularly adapted for engraving on a work element of rounded cross section capable of being rolled, comprising track means normally stationary during operation of the machine, a work supporting carriage including two elongated roller elements mounted side by side and forming between them an elongated trough in which said work element may rest, a cutter head and a rotary cutting tool mounted therein, said head and tool being mounted for movement in directions extending longitudinally of said trough and work and also in directions extending transversely of said trough and work, and means operatively connecting said cutter head to said carriage to transmit movements of said cutter head in directions transversely of said trough and work to said carriage to cause corresponding movement of said work element and roller elements bodily with respect to said track means with one of said elements in direct rolling contact with said track means so that, upon relative movement between said three elements and said track means, said work element will be turned relatively to said cutter head and tool, said means connecting said cutter head to said carriage being ineffective to move said carriage upon movement of said cutter head in directions extending longitudinally of said trough and work.

THEODORE MILLER.